United States Patent Office 2,945,894
Patented July 19, 1960

2,945,894

TRICHLOROMETHYLATED AROMATIC

Harold W. Earhart and William G. de Pierri, Jr., Baytown, Tex., assignors, by mesne assignments, to Esso Research and Engineering Company, Elizabeth, N.J., a corporation of Delaware No Drawing. Filed July 14, 1959, Ser. No. 826,926

1 Claim. (Cl. 260—651)

This invention relates to a new chemical. More particularly, this invention relates to a new trichloromethylated aromatic, namely $\alpha^1$, $\alpha^3$, $\alpha^5$-trichlorohexamethylbenzene. Polychloromethyl aromatic compounds find utility for a wide variety of purposes including the preparation of the corresponding polyhydroxy aromatic compounds, as disclosed in copending Earhart and De Pierri application Serial No. 826,925, filed of an even date herewith and entitled, "Chemical Compound." The polyhydroxy aromatic compounds may be used for the preparation of alkyd resins, polyester type plastics, etc.

$\alpha^1$, $\alpha^3$, $\alpha^5$-trichlorohexamethylbenzene may also be utilized directly for the preparation of polymers.

One of the problems encountered with respect to polychloromethyl alkylated aromatics is the problem of thermal stability.

The new compound of the present invention, $\alpha^1$, $\alpha^3$, $\alpha^5$-trichlorohexamethylbenzene, possesses many unusual and unexpected properties resulting from its trigonal symmetry. There are no known isomers of the compound. Thus, it has a comparatively high melting point (178° C.) and is thermally stable at temperatures up to and including the melting point. In contrast, most chloromethyl compounds tend to decompose or interreact at temperatures below the melting point thereof. For example, 1, 2, 4-trichloromethylbenzene liberates HCl on standing in sunlight. This is not the case with the compound of the present invention. Dichloromethylation products of trimethylbenzenes (dichloropentamethylbenzenes) decompose more readily than $\alpha^1$, $\alpha^3$, $\alpha^5$-trichloromethylbenzene and during chemical reactions tend to form polyaryl degradation products. This is not the case with the claimed compound.

In addition, the compound of the present invention is a highly active molecule which may be substantially selectively reacted with comparative ease with other materials to provide essentially uncontaminated products. For example, only one isomer is possible on reaction with materials such as KCN, NaOMe, etc.

The invention will be further illustrated by the following specific example which is given by way of illustration and not as a limitation on the scope of this invention.

Example

A 12-liter Morton stirring flask was fitted with a reflux condenser, a Trubore stirrer and thermometer. Into the flask was placed the following materials:

4200 ml. (51.2 mols) concentrated hydrochloric acid (37%)
1080 g. (36.1 mols) of paraformaldehyde
818.2 g. (5.9 mols) of anhydrous zinc chloride
185.2 g. (3.2 mols) of sodium chloride.

The contents of the flask were heated to 80° C. with stirring and 721.1 g. (6.0 mols) of mesitylene were added. The reaction mixture was heated at the reflux temperature for 10 hours, at the end of which period reaction was stopped. The maximum temperature, 99° C., was attained at the end of about 5 hours, and was maintained for the remainder of the reaction period.

The product was separated into beads by the use of a shock-chilling technique (as disclosed in copending De Pierri and Earhart application Ser. No. 827,087, filed of an even date herewith, and entitled, "Method for Recovering Solid Chloromethylation Products"), and was removed from the reaction mixture by filtration through a sintered-glass filter. The product, which remained on the filter, was washed with about 4 liters of water and was air-dried.

The product was analyzed by the following procedure. A sample was reduced with lithium aluminum hydride in toluene solvent, and the reduced sample was analyzed by use of a low voltage mass spectrometer. The product was found to contain the following distribution of materials:

| Compound: | Mol percent |
|---|---|
| Mesitylene | 0 |
| Chloromethylmesitylene | 6 |
| Dichloromethylmesitylene | 41 |
| Trichloromethylmesitylene | 51 |
| Indanes | 2 |
| Total | 100 |

The product was recovered by recrystallization from toluene. A total of 604 g. of trichloromethylmesitylene was recovered. This corresponds to a recovery of 76 percent of the trichloromethylmesitylene present in the product and to a yield of trichloromethylmesitylene of 38 percent of the theoretical amount.

What is claimed is:

$\alpha^1$, $\alpha^3$, $\alpha^5$-trichlorohexamethylbenzene.

No references cited.

Notice of Adverse Decision in Interference

In Interference No. 91,913 involving Patent No. 2,945,894, H. W. Earhart and W. G. De Pierri, Jr., Trichloromethylated aromatic, final judgment adverse to the patentees was rendered Jan. 6, 1964, as to claim 1.
[*Official Gazette April 28, 1964.*]